United States Patent [19]

Holroyd et al.

[11] Patent Number: 4,880,709
[45] Date of Patent: Nov. 14, 1989

[54] WELDED ALUMINUM ALLOY COMPOSITE

[75] Inventors: Nigel J. H. Holroyd, Brackley; Warren Hepples; Geoffrey M. Scamans, both of Oxon, all of England

[73] Assignee: Alcan International Limited, Montreal, Canada

[21] Appl. No.: 100,585

[22] Filed: Sep. 24, 1987

[30] Foreign Application Priority Data

Sep. 26, 1986 [GB] United Kingdom ............... 8623160

[51] Int. Cl.⁴ ............................................. B32B 15/20
[52] U.S. Cl. ................... 428/654; 219/146.22; 228/263.17; 420/541; 420/542
[58] Field of Search ................... 428/654; 228/263.17; 420/541, 542; 219/146.22

[56] References Cited

FOREIGN PATENT DOCUMENTS 1201656 8/1970 United Kingdom ............... 420/541
83-02415 7/1983 World Int. Prop. O. .

Primary Examiner—Robert McDowell
Attorney, Agent, or Firm—Cooper & Dunham

[57] ABSTRACT

Problems are caused by stress corrosion cracking and exfoliation cracking in the heat-affected zones adjacent welds in structure of welded components formed of Al alloys, particularly of the 7000 series but also of the 5000 series. The invention seeks to overcome these by the use of Al-Mg welding wire containing 0.01–0.5% Ga and/or In and/or Sn, the composition being chosen such that the weld bead has a potential at least as electronegative as the components and preferably in the range −1200 to −1300 mV with reference to a standard calomel electrode. To prevent diffusion of Ga/In/Sn, the components may be pre-coated e.g. by using a double-pass welding technique.

5 Claims, 1 Drawing Sheet

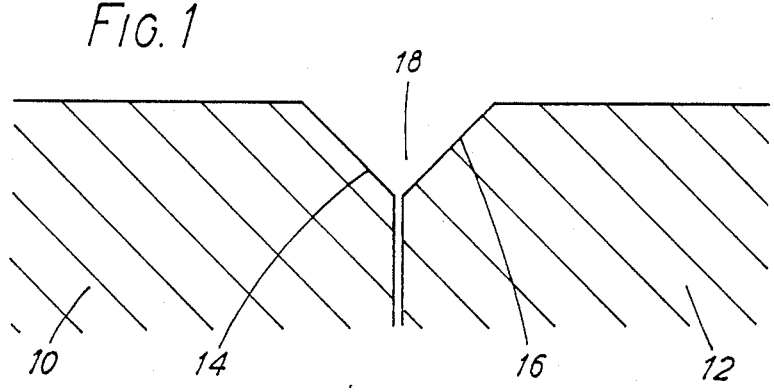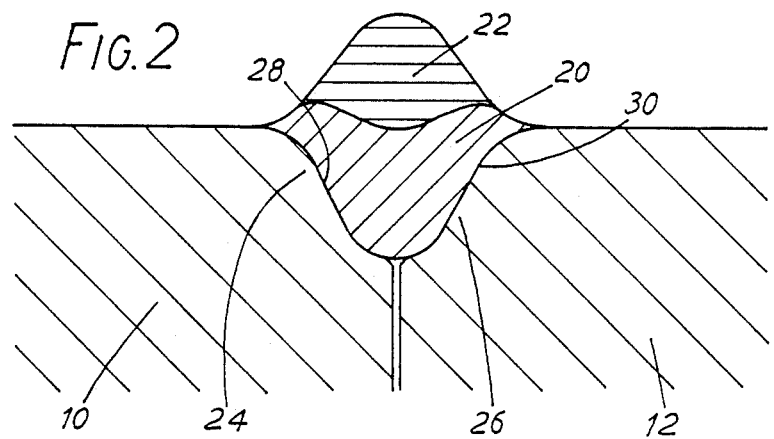

WELDED ALUMINUM ALLOY COMPOSITE

This invention concerns weldable aluminium alloys, particularly high strength alloys containing zinc and magnesium, for example those of the 7000 series of the Register of the Aluminum Association Inc. These alloys often contain Cu in amount up to 0.1% or 0.2% despite its adverse effect on weldability, and may contain minor additions of Mn, Cr, Zr, and Ti. The alloys can be naturally or artificially age-hardened. A wide range of mechanical properties can be obtained, depending mainly on composition and heat-treatment. These alloys have been reviewed by K. G. Kent, Metallurgical Reviews, No. 147, 135 to 146, 1970. These techniques may also be applied to other aluminium alloys which are prone to local corrosion around welds.

The operation of welding involves positioning two components to be welded with surfaces (faying surfaces) in contact, and applying molten filler metal to form a weld bead along the or each line bounding the faying surfaces. In order to maximize the strength of the welded structure, it is generally accepted that the weld bead should have a composition and properties as close as possible to those of the welded components. Conventional welding wire is often an Al alloy containing 5.25% Mg; as a result of diffusion during the welding operation, the weld bead often contains Zn and Mg in proportions approximating to those in the welded components. Heat treatment of the components prior to welding, and of the welded structure, are chosen to generate the desired combination of properties.

Microscopic examination of the structure of a weld reveals a boundary between a welded component and the weld bead and a narrow zone adjacent this boundary where parent metal of the welded component has been partially melted during the welding operation. This zone is characterized by a recrystallised, almost spheroidal grain structure, in which the grain interior contains significantly fewer precipitates than the adjacent unmelted parent metal. The primary phases here lie principally at the grain boundaries. On the basis of its appearance in an etched section, this zone has been called the "white zone" which phrase is used hereinafter. (H. Schmiedel and W. Gruhl, Metall., 38, 32 to 37, 1984.)

The strength of welded structures of these high strength Al alloys can be reduced by stress-corrosion cracking through this white zone. This phenomenon is well known, and has been widely discussed in the scientific literature (see e.g. H. Schmiedel et al. above). The phenomenon is properly called stress-corrosion cracking, for an applied stress and a corrosive environment are both required for cracking to propagate. It is known that 7000 series Al alloys are more prone to cracking when the (Zn+Mg) concentration exceeds about 6%. It has been reported that the grain boundaries of the white zone may contain enhanced Zn and Mg concentrations, sufficient to take the (Zn+Mg) level over this limit. M. S. Rahman et al (Z. Metallkde, 73, 589 to 593, 1982) have proposed using a welding wire containing additions of Ag to lower excess levels of Zn and Mg in the white zone.

Another kind of corrosive attack is known as exfoliation corrosion. This also has been widely discussed in the scientific literature (see e.g. K. G. Kent, above). Exfoliation corrosion can occur in naturally aged parent metal and in the heat affected zone (within a few mm of the white zone) of naturally ageing welds when the corrosive environment is severe. The attack is mainly intercrystalline but may be transcrystalline in the heat affected zone adjacent welds. Although external stress is not necessary, this corrosion may be regarded as a self-stressing form of attack, since multiple layers of corrosion products may build up.

Post weld ageing is often employed on appropriate structures (see Kent, above) to increase weld strength and reduce exfoliation corrosion. But this treatment increases the susceptibility to weld toe cracking.

5000 series alloys containing more than about 3% Mg may become subject to stress corrosion cracking if held at temperatures above about 30° C. for long periods. For example, components used in the tropics may be subject to this problem. Addition of 0.8-2% Zn to these alloys suppresses the stress corrosion cracking in unwelded material. When these alloys are welded, however, the heat affected zone becomes prone to exfoliation corrosion and weld toe cracking.

This invention addresses these phenomena of corrosive attack, stress-corrosion cracking in the white zone and exfoliation corrosion in the heat affected zone adjacent the white zone, but approaches them from an entirely novel direction. The inventors have considered the phenomena from an electrochemical viewpoint, and have tried to reduce or prevent crack propagation by electrochemical means, specifically by ensuring that the weld bead is not significantly cathodic relative to the white zone. This has involved altering the composition of the welding wire, which goes contrary to the accepted view in the field that the composition and properties of the weld bead should resemble as closely as possible those of the welded components.

It has also involved the entirely novel concept of using the weld bead as a sacrificial anode to electrochemically protect a particularly susceptible region (the white zone and the adjacent heat affected zone) of the welded component from damage. This goes completely against the conventional wisdom, that the weld is only as strong as the weld bead, which must accordingly be carefully protected.

In one aspect, this invention provides wire for welding aluminium components consisting of wire of composition 3.0 or 4.0 to 7.0% Mg; 0.01 to 0.5% Ga and/or In and/or Sn; balance Al. The phrase "balance Al" is used to mean Al optionally containing those additions or impurities, grain-refining elements, recrystallisation inhibitors and oxidation modifiers normally present in Al welding wires such as the AA series 5154 and 5556. An Mg content of at least 4% is preferred to avoid risk of hot cracking in the weld metal (see Kent, above). The wire may be of Ng 61 alloy (Al—5.25% Mg) of commercial or greater purity with additions of one or more of Ga, In and Sn, preferably In and/or Sn because Ga can sometimes give rise to undesirable embrittlement effects. Each of these additional elements, In and/or Sn preferably in a concentration of 0.02 to 0.4%, Ga preferably in a concentration of 0.02 to 0.2%, is effective to make more negative the potential of the metal. The wire may contain up to 5% Zn, with the proviso that, under certain circumstances, the (Zn+Mg) concentration preferably does not exceed about 6%. The welding wire is preferably of uniform diameter in the range of 0.5 to 5 mm, free of defects which could give rise to voids in the weld bead, with a thin uniform oxide coating free of hydrated oxides.

In another aspect, the invention provides a welded structure of two Al alloy components joined together by means of a weld bead of a filler metal, a white zone being present in a region of a first component adjacent a first component/weld bead boundary, wherein the filler metal of the weld bead comprises an Al alloy containing at least one of Ga, In or Sn in an amount such that the potential of the weld bead is not significantly less negative than that of the metal in the white zone.

The first component is generally an Al-Zn-Mg alloy eg a weldable 7000 series alloy containing not more than 0.3% Cu. Or the first component may be of another Al alloy, such as a 5000 series alloy which is prone to weld toe cracking. The weld bead may result from use of a welding wire of composition as above. The second component may be for example a weldable Al-Zn-Mg alloy of the 7000 series, in which case a second white zone susceptible to stress corrosion cracking will be present, or a weldable Al-Mg alloy of the 5000 series, in which case a second white zone susceptible to stress corrosion cracking will generally not be present. Welded 5000 series alloys are generally not subject to the same stress-corrosion cracking problems as 7000 series alloys. But 7000 series alloys are widely used because of the valuable property that weld zones age-harden at ambient temperature.

In order to provide electrochemical protection from corrosive attack, the weld bead must not be significantly cathodic relative to the white zone. Electrochemical protection appears to be provided when the potentials of the weld bead and the white zone are about the same. If the weld bead is too electronegative, it may itself corrode faster than desired, thus reducing the long-term strength of the weld. The potential of the weld bead is preferably from 0 to 100 mV, more negative than that of the metal in the white zone. The potential of the weld bead is preferably from −1200 to −1130 mV with respect to a saturated calomel electrode in a neutral saline environment. The optimum potential may differ in other environments, being for example less negative in nitrate electrolytes. Alloying elements such as Zn, Cu or Fe may diffuse into the weld bead and may make it more difficult for the weld bead to reach the required range of electrochemical potentials. Higher concentration of the activator elements may be effective to counteract this problem.

The white zone is generally at least as electronegative as the bulk of the welded components (including the heat affected zone adjacent the white zone). So a weld bead that is at least as electronegative as the white zone can in principle provide electrochemical protection also for the heat affected zone.

In another aspect, the invention provides a method of welding together aluminium components by the use of a welding wire which is melted to form a weld bead joining the components, characterized in that the welding wire is of an Al alloy containing at least one of Ga, In and Sn in an amount to make more negative the potential of the weld bead.

Welding may be effected by conventional methods, for example by inert gas shielded arc welding using as electrode either the welding wire (MIG welding) or a tungsten electrode (TIG welding). The welding wire may have the composition given above.

Because the weld bead is necessarily molten and the white zone partially molten during the welding operation, some migration of alloying ingredients unavoidably occurs. For example, Zn may migrate from the welded components into the white zone and into the weld bead. Ga or In or Sn may migrate from the weld bead into the welded component. Fe or Si may migrate from the welded component into the weld bead; both of these migrations are liable to have the effect of rendering the weld bead less electronegative in relation to the white zone. If the weld bead is significantly cathodic relative to the white zone, the weld bead will be unable to provide sacrificial anodic protection for the white zone and the weld will be liable to failure by stress-corrosion cracking. These factors need to be taken into account in determining welding conditions and particularly the composition of the welding wire.

Preferably, welding is performed under conditions to prevent significant migration of Ga, In or Sn from the welding wire/weld bead into the white zone. For example, a barrier can be applied to the surface of the components prior to welding. As a result, Ga, In and Sn will be substantially absent from the white zone. That is to say, the concentration of Ga, In and Sn in the white zone will be either zero or else so small that the resistance of the welded structure to stress corrosion cracking is not materially reduced.

According to a preferred feature of the invention, prior to application of metal containing Ga, In or Sn, there is applied to a weld region of the first component a coating of an Al alloy to reduce diffusion of alloying elements between the first component and the weld bead during welding. A suitable material for such a coating is an alloy of composition 3.0 to 7.0% Mg balance Al, such as the standard NG 61 welding wire. One way of applying this coating involves the use of a double-pass welding technique; the first pass is performed in the absence of a second component, using e.g. standard Al—5.25% Mg welding wire; the second pass is performed in the presence of the second component using welding wire with a Ga, In or Sn addition. Alternatively, it may be possible to perform the operation in a single pass using two wires, one to coat the component and the other to provide molten metal for the weld bead.

A preliminary coating so formed would be in an ascast state. It would therefore not be liable to give rise on welding to an additional white zone which might act as a centre for stress corrosion cracking.

BRIEF DESCRIPTION OF THE DRAWING

FIG. 1 is a sectional view through two components before being butt-welded together using a double-pass technique; and FIG. 2 is a similar sectional view through the same two components after being butt-welded together using a double-pass technique.

DETAILED DESCRIPTION

Reference is directed to FIGS. 1 and 2 of the accompanying drawings, which are sections through two components before and after being butt-welded together using a double-pass technique. The two components 10, 12, both of 7000 series alloy, abut at their ends and have edges chamfered at 14, 16 to form a groove 18. In FIG. 2 a composite weld bead, comprising a first deposit 20 and a second deposit 22, fills the groove. White zones 24, 26 occupy regions 1–2 mm thick adjacent the weld bead/component boundaries 28, 30.

The weld has been formed by a double-pass technique, using for the first pass a welding wire of composition Al—5.25% Mg substantially free of Fe, which has resulted in the first deposit 20. The second pass, using a welding wire of Al-Mg-Ga-In-Sn, has resulted in the second deposit 22. The first deposit 20 was sufficiently thick not to be penetrated by molten metal on the second pass.

Although the volumes of metal in the first and second deposits 20 and 22 are shown as approximately equal, it is not necessary that they should be so, and the ratio of the two volumes is not critical. The first deposit 20 should preferably provide a coating on the components 10, 12 that is thick enough to reduce or prevent diffusion between the white zone 24, 26 and the second deposit 22, and thick enough to avoid penetration on the second pass. A coating thickness of at least 0.5 mm is preferred for this purpose, which could be provided by various techniques of which welding is likely to be the most practical. The volume of metal in the second deposit should be sufficient for it to provide long-term electrochemical protection against exfoliaton corrosion and against stress-corrosion cracking in the white zones.

The following examples illustrate the invention.

EXAMPLE 1

A range of NG61 (Al—5¼ Mg) welding wire compositions have been D.C. cast as 66 mm diameter billet containing various levels of tin, indium and gallium activators, table 1.

TABLE 1

| | Alloy | Mg | Ga | In | Sn |
|---|---|---|---|---|---|
| A | Commercial purity NG 61 | 5.25 | 0.07 | | |
| B | Commercial purity NG 61 | 5.25 | 0.15. | | |
| C | High purity NG 61 | 5.25 | 0.1 | | |
| D | High purity Al | 5.25 | 0.1 | | |
| E | High purity Al | 5.25 | 0.04 | 0.04 | |
| F | High purity Al | 5.25 | 0.04 | | 0.08 |
| G | High purity Al | 5.25 | 0.15 | 0.35 | 0.2 |
| H* | Commercial purity Al | 5.38 | | 0.36 | 0.22 |
| I* | High purity Al | 5.31 | | 0.37 | 0.22 |

H*also contained 0.14% Fe; 0.19% Si; 0.73% Mn; 0.08% Cr; and 0.008% Ti.
I*also contained 0.01% Fe; 0.03% Si; 0.72% Mn; 0.07% Cr; and 0.06% Ti.

Alloys in table 1 have been hot-extruded to 2 mm diameter welding wire which has been used to produce bead-on-plate welds on 15 mm thick commercial 7017-T651 plate using automatic MIG welding.

Electrochemical potentials of the various microstructural regions associated with the welds have been measured using conventional potentiokinetic polarisation techniques. The results indicated in both neutral 3% sodium chloride and in acidified sodium chloride/sodium chromate solution (pH 3) that the activator additions to the welding wires can lead to weld beads with more negative potentials. These shifts are sufficient to reverse the weld bead/white-zone electrochemical potential couple as long as the activators do not diffuse into and activate the white-zone.

Table 2 below sets out the free corrosion potentials of the white zones and weld beads of the various welds exposed to (a) 3% sodium chloride and (b) 2% sodium chloride/0.5% sodium chromate pH 3. All figures are in mV relative to a standard calomel electrode.

TABLE 2

| | Free Corrosion Potentials (mV) | | | |
|---|---|---|---|---|
| | 3% Sodium Chloride | | 2% Sodium Chloride 0.5% Sodium Chromate | |
| | White Zone | Weld Bead | White Zone | Weld Bead |
| NG 61 | −1030 | −930 | −930 | −880 |
| A | −1070 | −1070 | −980 | −970 |
| B | −1080 | −1070 | −990 | −1010 |
| C | −1080 | −1060 | −1000 | −960 |
| D | −1080 | −1080 | −900 | −950 |
| E | −1070 | −1020 | −960 | −950 |
| F | −1080 | −1080 | −970 | −940 |

With conventional welding wire, the weld bead potential is distinctly less electronegative than the white zone potential (i.e. the weld bead is cathodic to the white zone). By the use of welding alloys A to F, this difference is reduced or eliminated. In this simple experiment, diffusion took place across the weld bead/welded component boundary, of activator metal into the white zone, and of Fe, Cu, Zn and Si into the weld bead. Stress corrosion cracking could have been overcome simply by taking steps to prevent this diffusion.

EXAMPLE 2

A range of double pass bead-on-plate welds on 15 mm thick commercial 7017-T651 plate have been fabricated using automatic MIG welding with the initial pass involving commercial grade NG61 and the final pass a NG61 welding wire composition containing activator additions of Sn, In and/or Ga.

Electron microprobe analysis scans across the resultant weld structures indicated that the initial pass acts as an effective diffusion barrier against activator elements entering white-zones as can occur with single-pass welds. Electrochemical potential of the various microstructural regions associated with double pass welds, e.g. regions 24, 20 and 22 in FIG. 2—the white-zone and the initial and final pass weld-beads, have been measured using the conventional potentiokinetic polarisation techniques. Results show that the double-pass technique can reverse the white-zone/weld bead electrochemical potential couple promoted in standard single-pass welds, Table 3.

TABLE 3

| | Free Corrosion Potential (mV) in 3% Sodium Chloride | |
|---|---|---|
| | Single-pass NG61 Weld | Double-pass NG61/Alloy G |
| Second pass | — | −1110 |
| First pass | −930 | −1150 |
| White-zone | −1030 | −1100 |

Identification of the anodic and cathodic regions in welded structures has been achieved by the immersion of polished cross-sections of bead-on-plate 7017 weldments for a few days in a 3% sodium chloride solution doped with 100 ppm copper added as copper chloride. Cathodic regions are decorated with deposited metallic copper and anodic regions become covered with corrosion products. For a standard single-pass weld (NG61) active corrosion sites were established at the weld-toes and in the heat-affected zone around the weldment a few mm into the plate away from the white-zone (exfoliation corrosion). A different result was obtained in the double-pass weld case (NG61/Alloy G). There was no evidence of exfoliation corrosion, white-zone attack or corrosion of the weld-toe regions even after two weeks immersion in the 3% sodium chloride solution. Active corrosion was limited to attack in the weld initial/final pass interfacial region which provided sufficient sacrificial protection to prevent corrosion elsewhere. The prevention of weld-toe and exfoliation attack has been reproduced when only the outer surface of the weldment and the parent plate were exposed to either 3% sodium chloride or the acidified saline environment.

EXAMPLE 3

Slow strain rate stress corrosion testing (SSRT) of welds has been conducted in neutral and acidified saline environments. (SSRT is a tensile testing technique involving application to a continuously increasing strain to fracture using straining rates $10^3$ times slower than conventional tensile testing rates, i.e. typical SSRT at $10^{-6}$/s). Representative results in terms of plastic elongation to failure for welds tested in an acidified saline environment are set out in Table 4. These indicate for the test conditions used that the double-pass weld technique gives rise to a very high resistance to weld-toe cracking. Fracture occurs mainly in the parent plate as it does for inert test conditions and the elongation to fracture values (around 10–11%) are similar to those obtained in inert test conditions. SSRT results for the standard single-pass weld (NG61) implies that a significant susceptibility to weld-toe cracking exists; the elongation to fracture is markedly reduced (5%), fracture occurs at the weld-toe/white zone region and cracking is observed during testing.

TABLE 4

Elongation to fracture and Potential during Slow Strain Rate Testing in 2% NaCl/0.5% $Na_2CrO_4$, pH3

| Alloy | Single pass Elongation (%) | Double pass Elongation (%) | (NG 61/alloy) Potential of testpiece during test (mV) | |
|---|---|---|---|---|
| NG 61 | 5 (w) | 5 (w) | | |
| E | 3.5 (w) | 9.8 (p or w) | −1060 | −960 |
| F | 4 (w) | 10.2 (p or w) | −1070 | −1000 |
| G | 3 (w) | 11.5 (p) | −1180 | |
| H | | 7–10 (w or p) | −1100 | −1030 |
| I | 3.2 (w) | 11 (p) | −1130 | | p - cracked in parent metal
w - weld toe stress corrosion cracking

EXAMPLE 4

An AA 7017 plate was welded using a double-pass technique involving NG61 with an alloy G (Table 1) active weld bead. After welding some of the plate was post-weld aged for twenty four hours at 120° C. and then subjected to slow strain rate testing in a pH 3 saline environment. The test data obtained was similar to that without post-weld ageing, in that weld toe cracking was prevented and fracture was in the parent plate.

EXAMPLE 5

An AA 5083 plate (4.5% Mg plus 0.7% Mn plus 0.3% Fe) having an addition of 0.8% Zn was welded using standard NG61 welding wire or a double-pass technique with NG61 and alloy H active weld bead. The plate was in the work hardened condition (H115 Temper), and after welding the samples were sensitized by heat treatment at 150° C. for seven days. (This treatment increases the tendency to stress corrosion in plate and in the welds.) Samples were subjected to slow strain rate testing at $2.5 \times 10^{-4}$ mm/sec in 3% NaCl plus 0.3% $H_2O_2$. The results were:

| | Ultimate Tensile Strength (MPa) | Elongation (%) |
|---|---|---|
| Single pass | 240 | 0.9 |
| Double pass | 336 | 4.5 |

The active weld bead substantially increases elongation to fracture, and thus substantially increases resistance to stress corrosion cracking.

We claim:

1. A welded structure of two Al alloy components joined together by means of a a weld bead of a filler metal, a white zone being present in a region of a first component adjacent a first component/weld bead boundary, wherein the filler metal of the weld bead comprises an Al alloy containing at least one of Ga, In or Sn in an amount such that the potential of the weld bead is more negative than that of the metal in the white zone, the filler metal being derived from an alloy wire containing from 0.01 to 0.5% of a metal selected from the class consisting of Ga, In and Sn.

2. A welded structure as claimed in claim 1, wherein the first component is of a 7000 series alloy.

3. A welded structure as claimed in claim 1, wherein Ga, In and Sn are substantially absent from the white zone.

4. A welded structure as claimed in claim 1, wherein the potential of the weld bead in a saline environment is from −1200 to −1130 mV with respect to a saturated calomel electrode.

5. A welded structure as claimed in claim 1, wherein the potential of the weld bead is up 0 to 100 mV more negative than that of the metal in the white zone.

* * * * *